Aug. 28, 1928.  1,682,098
P. F. SONNEK
ELECTRIC CIRCUIT CONTROLLING MEANS
Filed April 6, 1921  2 Sheets-Sheet 2
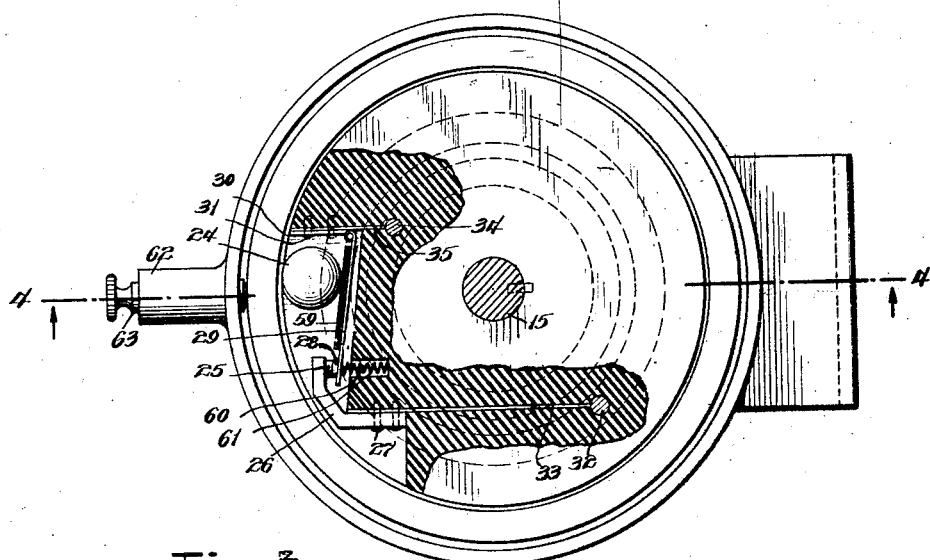
Fig. 3.
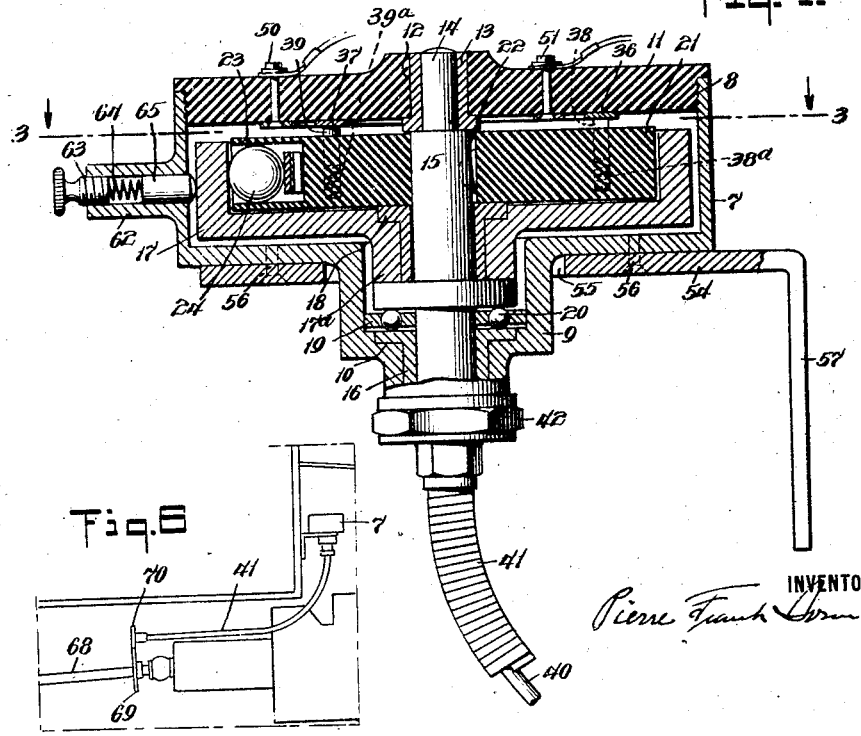
INVENTOR
Pierre Frank Sonnek Patented Aug. 28, 1928.

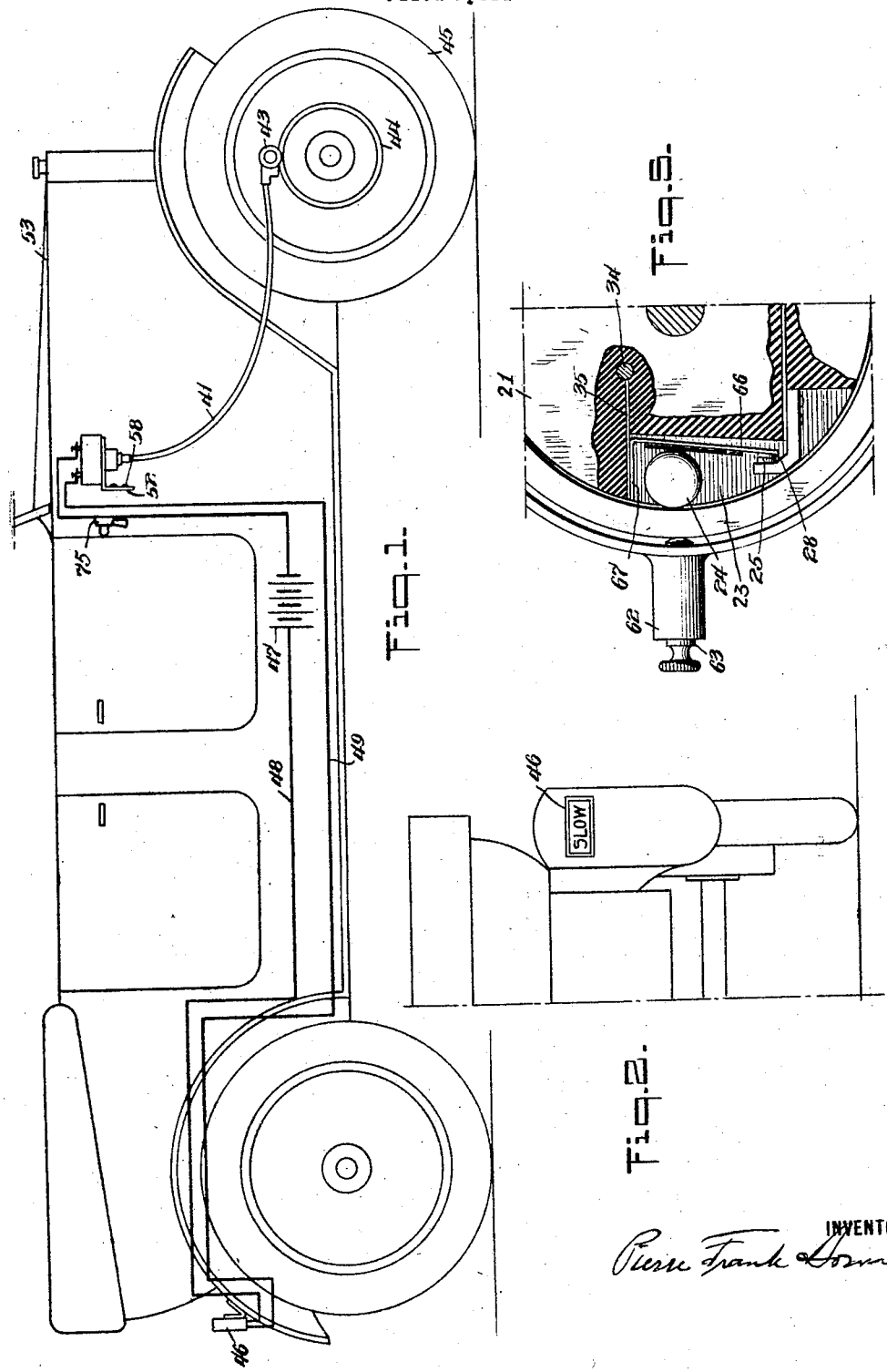

1,682,098

UNITED STATES PATENT OFFICE.

PIERRE FRANK SONNEK, OF WOODHAVEN, NEW YORK.

ELECTRIC CIRCUIT-CONTROLLING MEANS.

Application filed April 6, 1921. Serial No. 459,021.

The present invention relates generally to improvements in signalling devices, and is more especially directed to devices for automatically or otherwise indicating a change in speed or the slowing down of a vehicle, so that other vehicles may be controlled accordingly to avoid possible accidents.

As is well known, the regulations for governing traffic require that the driver or operator of a vehicle shall give notice of an intention to slow down or turn by a visual signal, in order that the operators of vehicles following may control the speed or course of their vehicles accordingly. Heretofore, the requisite signal has been given by the driver or operator extending his hand or by the use of manually controlled signalling devices of various forms.

With the largely increasing number of motor vehicles of the closed body types on the roads, it has been found that many accidents are caused by the failure of the drivers to notify those behind of their intention to turn or slow down, as the case may be. This may be attributed to the fact that the drivers find that in order to signal by using the hand it is necessary to keep the window of the car next the driver open, which frequently results in discomfort to the occupants. Therefore, hand signalling is more or less generally omitted. The manually operated signals are objectionable in that they impose an additional duty upon the driver of a vehicle, and those who are inclined to disregard the traffic regulations do not generally operate them.

An effort has been made to overcome the objections to the methods of signalling just described and to insure the giving of a signal by providing devices which are actuated upon the application of the service brakes to indicate an intention to slow down or stop. These are automatic, but the end which they are intended to accomplish is not served by reason of the fact that the speed of a vehicle may be diminished by other means than the use of the brakes, such as by closing the throttle, declutching or using the engine as a brake. In many instances, experienced drivers in ordinary driving employ their brakes to a relatively small extent.

From the foregoing, it will be obvious that to insure safety in traffic the human agency must be eliminated and a signalling device provided which will be automatically controlled by a change in speed of the vehicle irrespective of the means or manner by which the change in speed is accomplished.

Therefore, the general object of the present invention is the elimination of the driver of the vehicle as an element in the functioning of the signal so as to insure greater safety in the operation of vehicles than is possible under present conditions of signalling. With this in view, an important object of the present invention is to provide a signal, for motor vehicles and the like, which will automatically function to display a cautionary or warning signal upon any decrease in the speed of the vehicle to which it is applied irrespective of the agency by which the change of speed is brought about.

A further object of the present invention is to provide a signal of the character aforesaid which may be economically produced and installed on existing vehicles with a minimum of effort, or which may be incorporated in the structures of new vehicles without requiring any appreciable change in their design.

This invention further contemplates the provision of a signal for indicating diminishing speed in the movement of a vehicle by utilizing the movement of a constantly rotating part of the vehicle, such as a traction or road wheel or the like, and translating the movement of such constantly moving part into a force to function a visual signal of warning or caution.

Other objects and advantages of my invention will become manifest as the description proceeds, and I would have it clearly understood that I reserve unto myself all rights to the full range of equivalents, both in uses and structures, to which I may be entitled under my invention in its broadest aspect.

In order to afford a clear and comprehensive understanding of my invention, I have elected to describe one embodiment thereof, as shown in the accompanying drawings, in which Figure 1 is a diagrammatic view of a motor vehicle showing my invention applied thereto;

Fig. 2 is a diagrammatic view of a section of the end of a motor vehicle illustrating one form of visual signal which may be used in the practising of my invention;

Fig. 3 is a top plan view of the actuating mechanism of a signal made in accordance with my invention, with the cover of the housing removed and a portion of the rotor broken away to show the wiring for the brushes;

Fig. 4 is a sectional elevation on the line 4—4 of Fig. 3;

Fig. 5 is a view similar to Fig. 3 of a fragment of the actuating mechanism illustrating a modified structure for making and breaking the electric circuit; and Fig. 6 is a fragmentary diagrammatic view of a portion of a motor vehicle showing my signal driven from the propeller shaft.

Referring to the drawings in detail, in which like characters of reference are employed to designate similar parts throughout the several views, 7 indicates the housing for the actuating or controlling mechanism of my signal which may be cast or drawn up of metal and is preferably of an annular configuration, as shown. The upper end of the said housing 7 is open and internally threaded, as shown at 8, while the base is preferably provided with an integral boss 9 formed with an internal shoulder 10. The open end of said housing is adapted to be sealed or closed by the cover plate or closure 11, which may be formed of any suitable non-conductive material, and has the reduced portion of its periphery threaded for engagement with the threads 8 of the housing 7.

Centrally located in the cover plate 11 is an aperture 12 adapted to receive the bushing 13 which forms a bearing for the reduced portion 14 of the shaft 15, the lower end of said shaft being rotatable within the bushing 16 supported within the boss 9 and on the shoulder 10 thereof. Mounted for free rotation upon the shaft 15 is a cup-shaped element 17 which may be of cast or pressed metal, or of any other suitable material, and which, for the purposes of this description, shall hereinafter be termed a fly wheel. The fly wheel 17 preferably has a centrally located dependent portion 17$^a$ which is formed to receive the bushing 18 within which the shaft 15 is free to rotate. Between the adjacent surfaces of the bushing 10 and the dependent portion 17$^a$ of the fly wheel 17, I preferably interpose a thrust bearing comprising a collar 19 in which the ball bearings 20 are contained in the customary manner.

A rotor 21, formed of any suitable non-conductive material, is mounted on and keyed to the shaft 15, as indicated at 22, the diameter of this rotor being less than the internal diameter of the fly wheel 17, so that the rotor may rotate independently of the fly wheel 17, as and for the purposes hereinafter explained.

The periphery of the rotor 21 is formed with a recess 23, within which the ball 24 and the contacts for making and breaking an electric circuit are located. One contact point 25 is fixed and is preferably supported on a plate or bracket 26, which may be secured to the rotor by means of screws, as shown at 27. The other contact point 28 is carried by the plate 29 which preferably has a hinge connection with the plate 30 rigidly fastened to the wall of the recess 18, as shown at 31 in Fig. 3. The plate or bracket 26 is connected to the brush socket 32 by means of a wire or the like 33 located in a suitable bore within the rotor, while the plate 30 is similarly connected to the brush socket 34 by means of the wire 35.

Located on the inner surface of the cover plate or closure 11 are a pair of concentric contact rings 36 and 37 on which the brushes 38 and 39 located in the sockets 32 and 34, respectively, are adapted to ride, the said brushes being maintained in constant contact with said rings by the usual springs 38$^a$ and 39$^a$.

In the application and operation of my invention, the shaft 15 is connected to the flexible shaft 40 which is rotatable within the housing 41, by any suitable connection such as a pin and slot construction as now employed in speedometer construction, the shafts being held in connected relation by means of the coupling 42 preferably threaded on to the exterior of the dependent portion of the boss 9 of the housing 7. The other end of the flexible shaft 41 is connected to a pinion 43 supported on a suitable fixture, this pinion meshing with a sprocket 44 mounted to rotate with the vehicle wheel 45. The mounting of the sprocket 44 and the construction of the bracket supporting the pinion 43 may be of any design suitable to the purposes of my invention, but are preferably of the type used for actuating speed and distance-measuring devices.

The signal may be any medium which is suitable to the purpose, but in the present disclosure of my invention I have illustrated a housing 46 adapted to contain an electric light (not shown) which is in circuit with the battery 47 through the lines 48 and 49 connected to the terminals 50 and 51 leading from the contact rings 38 and 39, respectively, on the cover plate or closure 11.

In Figs. 1 to 5, inclusive, of the drawings, the housing 7 is preferably supported from the dash-board 52 of the vehicle and beneath the hood or bonnet 53 by a bracket which may consist of an annular plate 54 centrally apertured at 55 to freely pass over the boss 9 of the housing 7. This plate 54 may be fastened to the underside of the housing 7 by means of screws or the like 56, the right-angular and preferably dependent extension of the plate indicated at 57 being rigidly fastened to the dash-board by any suitable means such as the bolts shown at 58.

From the foregoing it will be seen that when the vehicle is set in motion, the shaft 15 will be rotated in its bearing carrying with it the rotor 21. As the rotor revolves, the inertia of the ball 24 will cause it to ride upon the insulated platform 59 of the plate 29 until it reaches the seizing angle between the said platform and the inner periphery of the fly wheel 17. This obviously will couple the rotor and the fly wheel so that they will revolve at the same speed or as a single element. In effecting the coupling of the rotor and the fly wheel as aforesaid, the plate 29 is depressed against the tension of the spring 60 contained within the recess 61 in the rotor 21, the contacts 28 and 25 being thereby separated and the circuit between the signal and the source of energy broken. While a uniform vehicle speed is maintained, it will be evident that the rotor and the fly wheel will remain coupled; but, as soon as the speed of the vehicle is diminished through any agency whatsoever, the speed of the rotor is correspondingly decreased while the inertia or the kinetic energy of the fly wheel will tend to cause the fly wheel to continue to rotate at the speed at which it was traveling when coupled to the rotor, the ball 24 being thereby dislodged from the angle of seizure. The spring 61 is thus released and functions to move the contact point 28 into engagement with the fixed contact 25, thereby closing the circuit through the brushes 38 and 39 and the co-operating contact and line wires 48 and 49 to illuminate the visual, cautionary signal. This signal may be of any suitable character such as the word "slow," which may be painted on a transparent medium such as a plate of glass mounted in the housing 46, so as to be clearly visible to operators of other vehicles.

In order to brake the speed of the fly wheel as soon as it functions to permit the closing of the circuit and the displaying of the signal, so that the maintenance of a new low speed or an increase in speed may effect the re-coupling of the fly wheel and rotor, in the manner heretofore described, I preferably provide a sleeve or extension 62 on the periphery of the housing 7 which is internally threaded to receive the thumb-screw 63, the inner end of which is constructed to form a seat for the spring 64 of the brush 65. By this means, the pressure of the brush 65 upon the periphery of the fly wheel 17 may be regulated, so that the revolution of the fly wheel may be governed to efficiently carry out the purposes of my invention.

In Fig. 5, in lieu of the plates 29 and 30, I provide a single plate 66 of resilient metal which has a bent-up portion 67 adapted to be secured to the wall of the recess 23 of the rotor 21. The free end of this plate 66 carries the movable contact 28, the ball 24 depressing the plate when reaching the seizing angle. The circuit is closed through the contacts 25 and 28 when the ball 24 is released from the seizing angle by the resiliency of the plate 66 itself.

In Fig. 6, it will be observed that the flexible shaft is driven from the propeller shaft 68 of the motor vehicle. For this purpose a sprocket 69 is mounted to rotate with said shaft 68 by means of which the flexible shaft within the housing 41 is driven through the medium of the pinion 70 which may be supported by any suitable bracket or other device not shown.

While I have shown my invention located on the dash-board of a vehicle, it is manifest that it may be located elsewhere, such as beneath the floor boards or upon any other part of the vehicle, where the means for opening and closing the electric circuit may be controlled by the movement of a constantly rotating part of the vehicle, while the latter is in motion. Furthermore, in some instances, it may be desirable to operate the circuit opening and closing mechanism by means of gearing, thus establishing a direct drive between the shaft 15 and the vehicle part from which the driving power is received.

It is obvious that when the vehicle on which my signal is employed comes to a stop that the rotor and fly-wheel may remain connected, and in order to conserve current under such conditions a suitable manually operated switch, such as indicated at 75, may be located in the circuit. Furthermore, if desired, operation of the car without the signal in functional condition may be prevented by connecting the signal circuit to the ignition circuit so that the former may be controlled through the operation of the switch of the latter. Obviously, by this means the vehicle cannot be started with the signal in inoperative condition.

While I have described my invention with reference to the specific embodiment and modifications herein shown, I would have it understood that various changes in details of structure may be made without departing from the spirit and scope thereof.

Claims:

1. A means for opening and closing an electric circuit, including a constantly driven element, fixed and movable contacts connected in said circuit, a normally inactive element associated with said driven element and means capable of movement with relation to each of said elements for connecting them and simultaneously effecting the opening of said circuit, the disconnection of said elements effecting the closing of the circuit.

2. A circuit breaker for an electric circuit, comprising a shaft adapted for connection to a moving body, a rotor keyed to said shaft, a switch carried by said rotor and connected in said circuit, a fly-wheel rotatably mounted on said shaft, means for releasably connecting said rotor to said fly-wheel and simultaneously opening said switch and means for closing said switch when said rotor and fly-wheel are disconnected.

3. A circuit breaker comprising a housing, a shaft mounted therein, a rotor keyed to said shaft and provided with a peripheral recess, a cup-like member freely rotatable on said shaft between said rotor and said housing, movable and fixed contact members located within said recess, and means for connecting said rotor and said cup-like member and simultaneously opening a circuit through said contacts, the disconnection of said elements effecting the closing of such circuit.

4. An apparatus for indicating the speed of a moving body through the medium of an electric circuit and means responsive to the speed of such body for opening and closing such circuit, said means embodying a driven shaft, an element rotatable with said shaft, a fixed and a relatively movable contact, each connected in said circuit, carried by said element, a second element freely rotatable with relation to said shaft and means for coupling the latter element to the first-named element to maintain the circuit in open condition, the disconnection of said elements, from each other, effecting the closing of the circuit through said contacts.

5. A circuit breaker adapted to be functioned by the speed of a moving body to open and close an electric circuit, comprising a shaft, a rotor keyed to said shaft and provided with a peripheral recess, a fixed contact carried by said rotor, a spring actuated contact located within said recess in association with said fixed contact, an annulus freely rotatable upon said shaft and means movable within said recess for coupling said annulus to said rotor and simultaneously opening said circuit, by effecting the movement of one of said contacts in opposition to its spring.

6. A circuit breaker adapted to be functioned by the speed of a moving body to open and close an electric circuit, comprising a shaft arranged for connection to such body, a rotor keyed to said shaft and provided with a peripheral recess, a fixed contact carried by said rotor, a spring actuated contact located within said recess in association with said fixed contact, an annulus freely rotatable upon said shaft, means controlled by the relative speed of rotation of said rotor and said annulus for opening and closing said circuit through said contacts and means for applying braking effort to said annulus independently of the influence of said rotor.

7. A circuit breaker adapted to be functioned by the speed of a moving body to open and close an electric circuit, comprising a shaft arranged for connection to such body, a rotor keyed to said shaft and provided with a peripheral recess, fixed and movable contacts within said recess, movable means for maintaining said contacts in constant connection with a source of energy and a suitable ground, an annulus freely rotatable upon said shaft, means for frictionally connecting said rotor and said annulus to open said circuit and means functioning to close said circuit when said annulus is disconnected from said rotor.

8. A circuit breaker adapted to be functioned by speed changes of a moving body to open and close an electric circuit, comprising an element adapted to be driven by such body, a non-conductor carried by said element, fixed and movable contacts supported from said non-conductor, said contacts being connected in the electric circuit, a device freely movable with respect to said element and to said non-conductor and a member supported between said non-conductor and said device to frictionally connect the latter to the former and thereby open said circuit and means for closing said circuit when said non-conductor is movable independently of said device.

9. A circuit breaker adapted to be functioned by speed changes of a moving body to open and close an electric circuit, comprising a shaft adapted to be driven by such body, a member of non-conductive material carried by said shaft, said member having connections in said circuit, a device freely rotatable upon said shaft, means for frictionally connecting said device to said member to open the circuit, means for closing the circuit through said member when said device is disconnected therefrom and means for governing the movement of said device when disconnected from said member.

PIERRE FRANK SONNEK.